United States Patent [19]

Yamaguchi et al.

[11] Patent Number: 5,060,476
[45] Date of Patent: Oct. 29, 1991

[54] DIFFERENTIAL AREA MOTOR CIRCUIT FOR HYDROSTATIC TRANSMISSION CONTROL

[75] Inventors: Kouji Yamaguchi; Junichi Miyake, both of Saitama; Kazuya Maki, Aichi, all of Japan

[73] Assignee: Honda Giken Kogyo Kabushiki Kaisha, Tokyo, Japan

[21] Appl. No.: 262,931

[22] Filed: Oct. 19, 1988

[30] Foreign Application Priority Data

| Oct. 19, 1987 | [JP] | Japan | 62-263055 |
| Oct. 19, 1987 | [JP] | Japan | 62-263059 |
| Oct. 20, 1987 | [JP] | Japan | 62-264840 |

[51] Int. Cl.⁵ ............ F15B 15/17; F16D 31/08; F16D 31/00
[52] U.S. Cl. .................................. 60/487; 60/468; 91/189 A; 91/417 R; 91/459; 92/110
[58] Field of Search ........... 91/417 R, 178, 189 A, 91/361, 363 R, 429, 459; 60/487–490, 494, 468; 92/52, 65, 110, 113

[56] References Cited

U.S. PATENT DOCUMENTS

| 3,763,744 | 10/1973 | Fournell et al. | 91/363 R X |
| 3,768,373 | 10/1973 | Divigard | 91/417 R |
| 3,874,407 | 4/1975 | Griswold | 91/417 R X |
| 3,907,043 | 9/1975 | Appleman . | |
| 3,943,715 | 3/1976 | Miyao et al. | 91/417 R X |
| 4,111,074 | 9/1978 | Northup . | |
| 4,158,290 | 6/1979 | Cornell . | |
| 4,256,017 | 3/1981 | Eastman | 91/417 R |
| 4,343,150 | 8/1982 | Shuler et al. | 60/488 X |
| 4,386,553 | 6/1983 | Thoman et al. | 91/417 R X |
| 4,673,162 | 6/1987 | Lachmann | 91/417 R X |
| 4,766,921 | 8/1988 | Williams | 91/459 X |
| 4,776,165 | 10/1988 | Iino | 60/431 |
| 4,913,005 | 4/1990 | Ishikawa et al. | 74/866 |
| 4,938,101 | 7/1990 | Maki et al. | 74/866 |

FOREIGN PATENT DOCUMENTS

| 640960 | 5/1962 | Canada | 92/85 B |
| 0240178 | 10/1987 | European Pat. Off. . | |
| 2246809 | 3/1974 | Fed. Rep. of Germany | 91/417 R |
| 95722 | 8/1981 | Japan . | |
| 62701 | 4/1984 | Japan | 91/417 R |
| 249761 | 12/1985 | Japan . | |
| 207229 | 9/1986 | Japan . | |
| 29420 | 2/1987 | Japan . | |
| 127562 | 6/1987 | Japan . | |
| 204052 | 9/1987 | Japan . | |

Primary Examiner—Edward K. Look
Assistant Examiner—George Kapsalas
Attorney, Agent, or Firm—Lyon & Lyon

[57] ABSTRACT

In a hydraulic servo unit comprising a cylinder and a piston slidably inserted therein, the cylinder chamber being divided by a piston portion into a rod-side cylinder chamber and a head-side cylinder chamber, a control apparatus for the hydraulic servo unit includes but is not limited to a first hydraulic line connecting the rod-side cylinder chamber with the hydraulic pressure source which supplies working fluid of a predetermined pressure, a second hydraulic line connecting the head-side cylinder chamber with the first hydraulic line through a first solenoid valve of duty-ratio-control, and a drain hydraulic line connecting the head-side cylinder chamber with drain through a second solenoid valve of duty-ratio-control.

61 Claims, 7 Drawing Sheets

DIFFERENTIAL AREA MOTOR CIRCUIT FOR HYDROSTATIC TRANSMISSION CONTROL

BACKGROUND OF THE INVENTION

The invention relates to a control apparatus that utilizes solenoid valves for controlling hydraulic servo units which are used, for example, for speed reduction ratio control and clutch control required in a variable speed transmission.

There have been proposed various types of continuously variable speed transmissions for vehicles used in continuously varying the input rotational speed and transmitting it as an output. For example, Japanese Patent Laid-Open Publication No. 56(1981)-95722 discloses a continuously variable speed transmission for vehicles, comprising a closed hydraulic circuit having therein a constant displacement hydraulic pump and a variable displacement hydraulic motor.

In such a continuously variable speed transmission, clutch operation at the time of starting or stopping, and speed reduction ratio change during cruising, are controlled by servo units based on signals representing the engine throttle opening and the vehicle speed. For example, such control may be given as shown in FIG. 7A, by means of four solenoid valves $163a$ through $163b$ which serves to increase or decrease the hydraulic pressure Pl of the working fluid supplied from the line 162 connected with the right and left cylinders of the servo cylinder 161, or as shown in FIG. 7B, by means of two solenoid valves $166a$ and $166b$ which function via a four-way valve 165.

In the case of FIG. 7A, however, four solenoid valves are needed, and in the case of FIG. 7B, a four-way valve is needed, though four valves are not required. In any case, the use of these valves makes the design, the manufacture, and the control of the servo unit not only complicated but also costly. In particular, in a continuously variable speed transmission this leads to a disadvantage in that the transmission becomes large in size and complex, since the transmission requires servo units for controlling speed reduction ratio and clutch operation, respectively.

Another disadvantage with a conventional servo unit is that it cannot provide desirable control in the case of solenoid valve malfunction. Therefore, various designs for such servo units have been disclosed in the prior art as containing fail-safe measures in the event of such solenoid valve malfunction, in which, for example, one of the servo units is slowly operated by slowly releasing the clutch off. For example, Japanese Patent Laid-Open Publication No. 60(1985)-249761, discloses an apparatus in which a four-way valve undertakes pressure control in the right and left cylinder chambers of the servo cylinder for ratio control of a continuously variable speed transmission. The operation of the four-way valve being controlled by a solenoid valve and, in case the solenoid valve is inoperable due to its malfunction, either the four-way valve is maintained so as to prohibit the ratio control or the hydraulic fluid is furnished through an orifice so as to slowly vary the reduction ratio until the ratio reaches its maximum or minimum.

However, if the reduction ratio is prohibited to change as illustrated above, it remains so and cannot be reduced to LOW (maximum speed reduction ratio) when the vehicle is started again, and hence a smooth start will not be available. Furthermore, the use of a four-way valve has above-mentioned disadvantage that the control apparatus becomes large in size and complex.

Clutch control for a transmission is, as mentioned above, often given by means of servo units utilizing solenoid valves. With these systems it may happen that the solenoid valves fail to operate, leaving the clutch in operational engagement even if the shift lever is brought back to its neutral position and an OFF signal is generated.

SUMMARY OF THE INVENTION

An object of the invention is to provide a control apparatus which can control the operation of servo units by means of only two solenoid valves.

Another object of the invention is to provide a speed control apparatus which is simple in structure, easy to control, and not costly.

A further object of the invention is to provide a reliable speed control apparatus capable of furnishing a fail-safe operation in case solenoids fail.

A still further object of the invention is to provide a control apparatus for use with servo units for controlling a clutch of a transmission, which is capable of switching the clutch from an ON state to an OFF state by bringing the shift lever into a neutral position when the clutch is turned ON by a solenoid valve malfunction.

In order to accomplish the above objects, the speed control apparatus according to the invention comprises:

a first hydraulic line connecting the "rod-side cylinder chamber" with the hydraulic pressure source which supplies working fluid of a predetermined pressure, a second hydraulic line connecting the head-side cylinder chamber with the first hydraulic line through a first solenoid valve of duty-ratio-control, a drain hydraulic line connecting the head-side cylinder chamber with a drain through a second solenoid valve of duty-ratio-control.

It is preferable to provide in the second hydraulic line a first orifice having a predetermined flow passage area, and a second orifice in the line extending from the second solenoid valve to the drain, the second orifice having a smaller flow passage area than the first orifice.

An alternative speed control apparatus according to the invention comprises:

a first hydraulic line connecting the "rod-side cylinder chamber" with the hydraulic pressure source which supplies working fluid of a predetermined pressure, a second hydraulic line connecting the head-side cylinder chamber with the first hydraulic line through a first solenoid valve of duty-ratio-control, a drain hydraulic line connecting the head-side cylinder chamber with drain through a second solenoid valve of duty-ratio-control, a hydraulic branch line one end of which is connected with a portion of the second hydraulic line between the hydraulic pressure source and the first solenoid valve, and the other end of which is connected with the head-side cylinder chamber, a check valve provided in the hydraulic branch line for permitting the working fluid from the head-side cylinder to flow only in the direction from the head-side cylinder chamber into the second hydraulic pressure line, and a shift valve provided in a portion of the second hydraulic line between the hydraulic pressure source and a branching point of the branch line. The shift valve shuts the second hydraulic line on a side of the hydraulic pressure source and connects the second hydraulic line on a side of the branching point with a drain when a neutral range is selected, but allows working fluid to flow through the second hydraulic line when a running range is selected.

Further scope of the applicability of the present invention will become apparent from the detailed description given hereinafter. However, it should be understood that the detailed description and specific examples, while indicating preferred embodiments of the invention, are given by way of illustration only and that various changes and modifications within the spirit and scope of the invention will become apparent to those skilled in the art.

BRIEF DESCRIPTION OF THE DRAWINGS

The present invention will become more fully understood from the detailed description given hereinbelow and the accompanying drawings, which are given by way of illustration only and do not limit the scope of the present invention. Hence.

DESCRIPTION OF THE PREFERRED EMBODIMENTS

Figure 1:
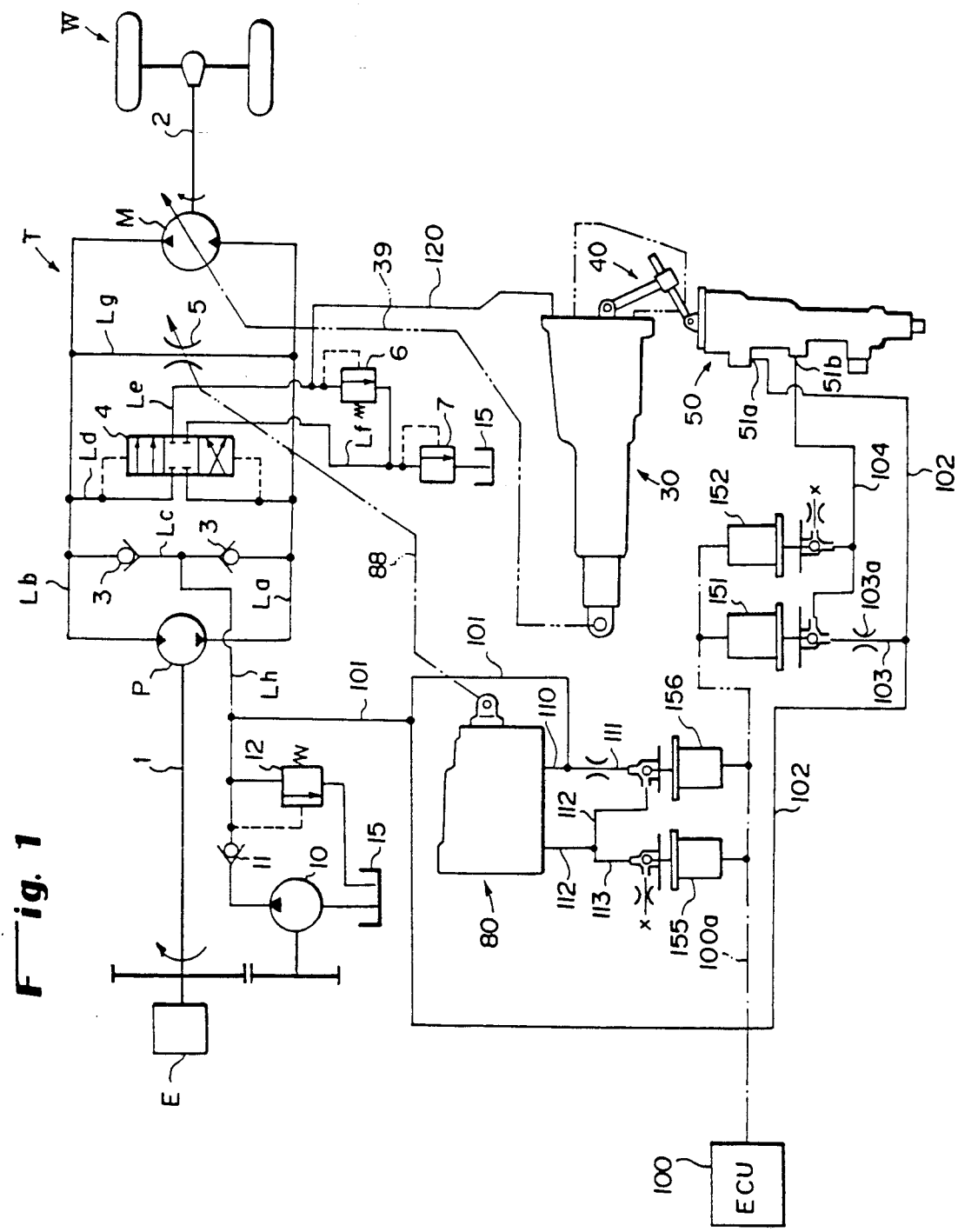
FIG. 1 is a schematic diagram of a hydraulic circuit used in a continuously variable speed transmission having a control apparatus according to the invention.

FIG. 1 shows a hydraulic circuit diagram of a continuously variable speed transmission provided with a control apparatus, according to the first embodiment of the invention. The continuously variable speed transmission has a constant displacement hydraulic pump P driven by the engine E through the input shaft 1 and a variable displacement hydraulic motor M connected to the output shaft 2 driving the wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P does with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La or Lb which is at a lower pressure, through the check valves 3 and 3. A fourth hydraulic line Ld having a shuttle valve 4 is connected to the closed circuit. To the shuttle valve 4 is connected a fifth hydraulic line and a sixth hydraulic line which respectively have a high pressure relief valve 6 and a low pressure relief valve 7 and are connected to the oil sump 15. The shuttle valve 4 is a 2-port, 3-position selector valve, which is operated in response to a hydraulic pressure difference of the first and second hydraulic lines to connect either of the first or second hydraulic lines La having higher, pressure with the fifth hydraulic line Le as well as to connect the other of the first and second hydraulic lines having lower pressure to the sixth hydraulic line Lf. Therefore, the relief hydraulic pressure of a higher pressure-side line is regulated by the high pressure relief valve 6, and the relief hydraulic pressure of the other, lower pressure-side line is regulated by the low pressure relief valve 7.

Between the first and the second hydraulic lines La and Lb is provided a seventh hydraulic line Lg through which both lines can be communicated with each other. The seventh hydraulic line Lg is provided with a clutch valve 5, a flow metering valve to control the opening degree of the line Lg. The clutch valve 5 is actuated by a clutch servo unit 80 which is connected thereto through a link 88. Therefore, the flow metering control of the clutch valve 5 by the actuation of the clutch servo valve 80 can accomplish a clutch control for controlling the transmission of driving power from the hydraulic pump P to the hydraulic motor M.

Actuators for controlling the speed reduction ratio of the continuously variable speed transmission T by way of the displacement control of the hydraulic motor M are the first and the second ratio control servo units 30 and 50 connected to one another by a link mechanism 40. The hydraulic motor M is a swash plate type axial piston motor whose displacement is varied by the control of swash plate angle by the ratio control servo units 30 and 50.

The actuations of the ratio control servo valves 30 and 50, and control of the clutch servo valve 80, are respectively controlled by pairs of solenoid valves 151, 152 and 155, 156 which are duty-ratio-controlled by signals from a controller 100. The controller 100 receives signals corresponding to such parameters as vehicle speed V, engine speed Ne, throttle opening $\theta$th, swash plate angle $\theta$tr of the hydraulic motor M, accelerator pedal opening $\theta$acc operated by a driver, atmospheric pressure Pat, oil temperature To, water temperature Tw and clutch opening $\theta$cl. The controller 100, based on the above signals, outputs signals for controlling the above solenoid valves to effectuate desirable traveling control. Here, the engine throttle valve opening $\theta$th and the accelerator pedal opening $\theta$acc to actuate the engine throttle valve are parameters representing the driver's intention to accelerate or decelerate. The accelerator pedal opening $\theta$acc is "full-open" when the accelerator pedal is fully depressed, and "full-closed" when fully released.

The structures and operations of the above servo units 30, 50 and 80 are described in detail hereinafter.

Figure 2:
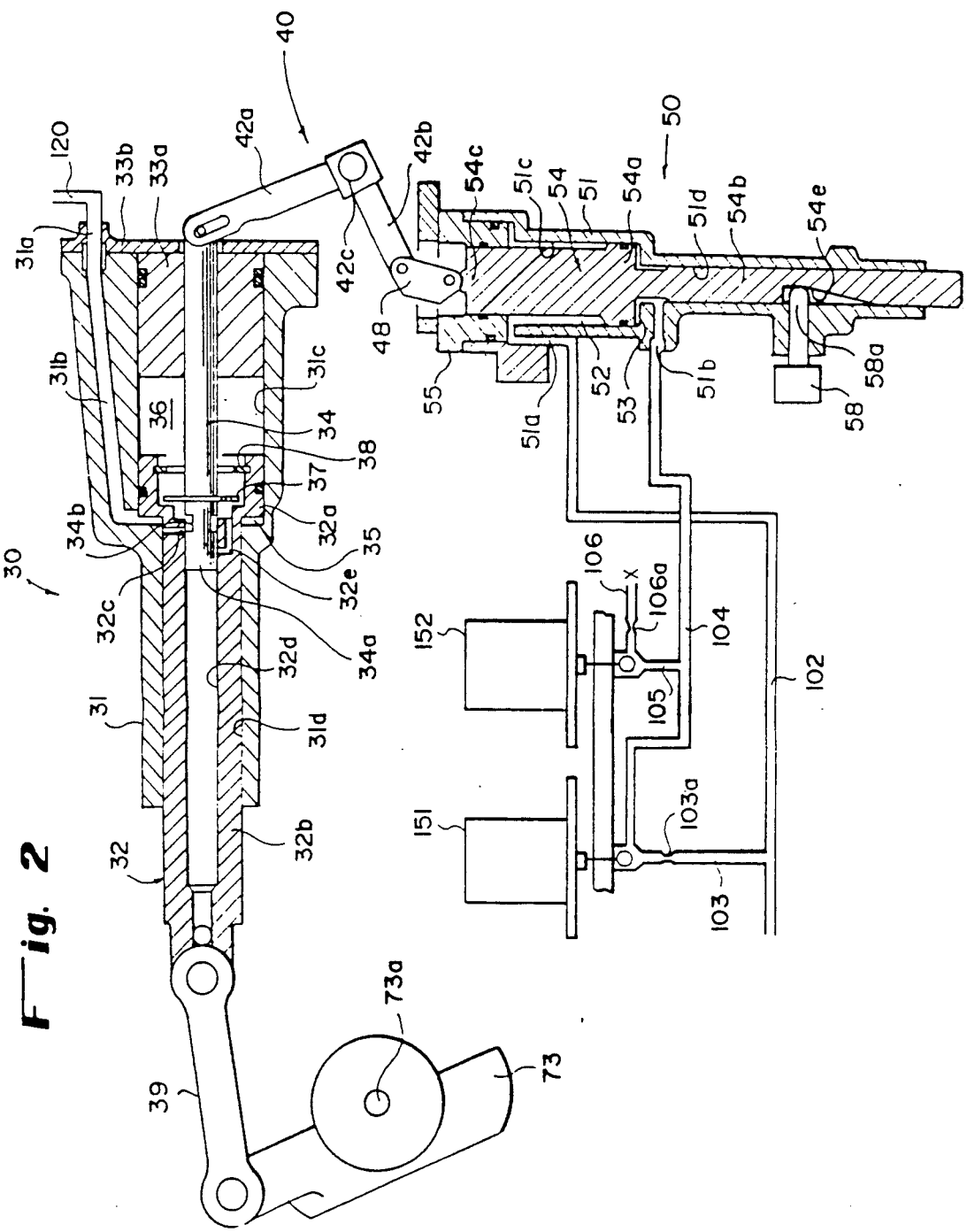
FIG. 2 is a cross sectional view of a first and a second speed control servo unit.

Referring first to the ratio control servo units 30, 50 shown in FIGS. 1 and 2, the first ratio control servo unit 30 controls the swash plate angle of the hydraulic motor M with the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a is communicated with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b having diagonal planes with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 36 to the oil sump (not shown) through the spool hole 32d responding to the rightward motion of the spool member 34 and a connection passage 32c which can connect the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure applied and therefore the piston member 32 is moved so as to follow the spool member 34.

When the spool member 34 is held still, the piston member 32 is also held still creating a hydraulic floating state because of pressure balance between the left and right cylinder chambers 35, 36.

As aforesaid, when the spool member 34 is moved leftward or rightward, the piston member 32 is moved laterally so as to follow the spool member 34 with the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a, an end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a rod-side (upper) and a head-side (lower) cylinder chamber 52, 53, respectively. The end spool portion 54b is fitted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 are communicated with the rod-side and head-side cylinder chambers 52, 53 through the ports 51a, 51b. The spool member 54 is moved up or down by the difference of hydraulic forces applied to the piston portion 54a which are determined based on the differences of hydraulic pressures and of areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressures supplied through the hydraulic lines 102, 104 enables the control of the motion of the spool member 34 and the piston member 32 in the first servo unit 30 and also enables the control of the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a to the rod-side cylinder chamber 52 is sent through a hydraulic line 101 and 102 from the delivery line of the charge pump 10 after its pressure is regulated by the charge pressure relief valve 12. The oil pressure in the hydraulic line 104 connecting the port 51b to the head-side cylinder chamber 53 is obtained by regulating the oil pressure in a hydraulic line 103 (including an orifice 103a therein), which is branched from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls drain-flow of the hydraulic oil from the line 104 in accordance with a given duty ratio.

As a result, to the rod-side cylinder chamber 52 a charge pressure regulated by the charge pressure relief valve 12 is applied through the line 102, while to the head-side cylinder chamber 53 is supplied from the line 104 a lower pressure than the charge pressure which is regulated by the first and second solenoid valves 151 and 152. Since the pressure-applied area of the rod-side cylinder chamber 52 is smaller than that of the head-side cylinder chamber 53, the forces due to the oil pressures in the cylinder chambers 52 and 53 acting on the spool member 54 keep their balance when the oil pressure in the head-side cylinder chamber 53 is a specified value Pl which is smaller than the oil pressure Pu in the rod-side cylinder chamber 52 (Pu>Pl). Therefore, when the oil pressure supplied to the head-side cylinder chamber 53 from the line 104 is controlled by the first and second solenoid valves 151 and 152 so as to be higher than the above pressure Pl, the spool member 54 is moved upward to have a small swash plate angle of the hydraulic motor M, i.e., to have a small speed reduction ratio, while when the oil pressure supplied to the head-side cylinder chamber 53 from the line 104 is controlled so as to be smaller than the above pressure Pl, the spool member 54 is moved downward to have a relatively large swash plate angle of the hydraulic motor M, i.e., to have a relatively large speed reduction ratio.

Both of the solenoid valves 151 and 152 are controlled by signals from the controller 100. By controlling the operations of the two solenoid valves 151 and 152 based on the signals from the controller 100, the actuations of the first and second ratio control servo units 30 and 50 are controlled. This results in the control of the displacement of the hydraulic motor M, and therefore in the control of speed reduction ratio.

The first and second orifices 103a and 106a, each provided in the hydraulic line which is under duty ratio control by said first and second solenoid valves 151 and 152, respectively, are provided as a fail-safe measure in case both the solenoid valves 151 and 152 fail to operate and become OFF. For this purpose the flow passage area $A_1$ of the first orifice 103a is made not only greater than the similar area $A_2$ of the second orifice 106a ($A_1 > A_2$) but also chosen as will now be discussed.

When both of the solenoid valves 151 and 152 fail to operate due to malfunction or electrical failure, thereby falling into an OFF state, the working fluid oil in the hydraulic line 103 flows into the hydraulic line 104 through the first orifice 103a and further flows into the drain (oil sump 15) from hydraulic line 106 through the second orifice 106a. Since $A_1 > A_2$, the hydraulic pressure Pa in the hydraulic line 104 becomes lower than the pressure Pu in the hydraulic lines 103 and 102, and the pressure Pa can be set at an arbitrary magnitude depending upon the ratio of the two flow passage areas $A_1$ and $A_2$. For example, if the ratio ($A_1/A_2$) is increased, the pressure Pa in the hydraulic line 104 approaches the pressure Pu in the hydraulic lines 102, while the pressure Pa approaches zero when the ratio is decreased.

Thus, when both the solenoid valves 151 and 152 become, for example, OFF, then by adjusting this ratio so that the pressure Pa in the hydraulic line 104 becomes a little higher than said predetermined value Pl, the pressure Pu acts in the rod-side cylinder chamber 52 of the second ratio control servo unit 50 and the pressure Pa acts in the head-side cylinder chamber 53. Hence the spool member 54 receives greater pressure from the head-side cylinder chamber 53, the spool member 54 is thereby moved upward to increase the speed reduction ratio (i.e., the reduction ratio is varied towards LOW).

It is noted, however, that the force acting on the spool member 54 upwardly is small because the pressure Pa in the head-side cylinder chamber 53 is higher than the pressure Pl only slightly, and therefore that spool member 54 is moved upward slowly and the speed reduction ratio is varied slowly towards LOW. In this manner, a slow change in the speed reduction ratio towards LOW will provide a fail-safe function even when both of the solenoid valves 151 and 152 become OFF due to, for example, a malfunction during driving.

Although in the example above the pressure Pa in the hydraulic line 104 (or pressure in the head-side cylinder chamber 53) is set a little higher than the predetermined pressure Pl, the pressure Pa may alternatively be set a little lower than Pl so that when the two valves 151 and 152 becomes OFF, the spool member 54 is slowly moved downward to gradually change the speed reduction ratio towards TOP (HIGH) as a fail-safe.

Figure 3:
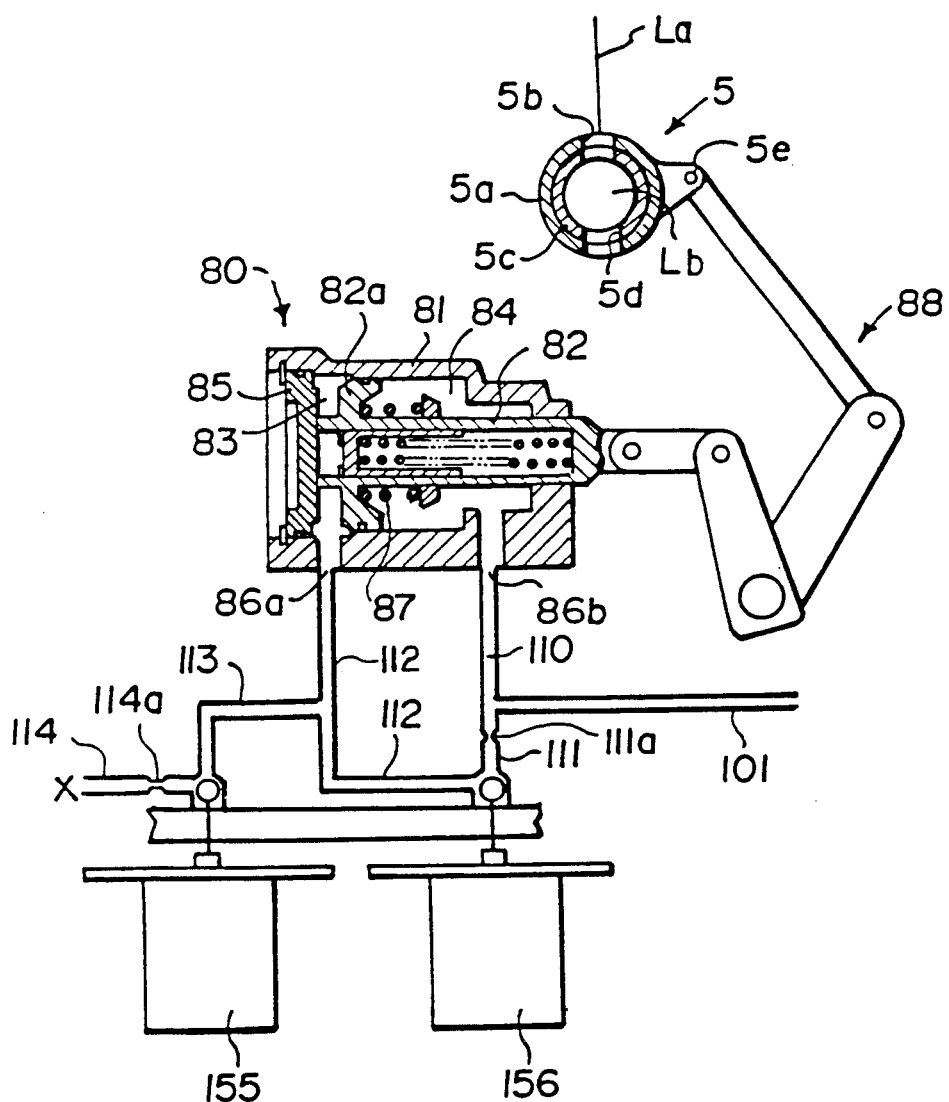
FIG. 3 is a cross sectional view of a clutch servo unit.

The following is a detailed description of the construction of the clutch servo unit 80 based on FIG. 3. The clutch servo unit 80 consists of a cylinder member 81, a piston member 82 inserted in the cylinder member 81 slidably to the right and left, a cover member 85 fixed to cover the cylinder chamber into which the piston member 82 is inserted, and a spring 87 pushing the piston member 82 to the left. A piston 82a on the piston member 82 divides the cylinder chamber 81 into a head-side (left) cylinder chamber 83 and a rod-side (right) cylinder chamber 84. Hydraulic lines 112 and 110, are connected to the head-side cylinder chamber 83 and the rod-side cylinder chamber 84, respectively, via ports 86a and 86b, respectively.

The hydraulic oil in the hydraulic line 110 is transferred from the charge pump 10 (whose delivery pressure is regulated by the charge pressure relief valve 12) through a hydraulic line 101, while the hydraulic oil in the hydraulic line 112 is transferred from the hydraulic line 101 through a hydraulic line 111. When the hydraulic oil is diverged into the line 111 and passes through an orifice 111a in the line 111, hydraulic oil pressure is controlled by the two duty-ratio-controlled solenoid valves 155 and 156. Here, the solenoid valve 156 is provided to control the flow rate of the hydraulic oil flowing from the line 111 (having the orifice 111a therein) to the line 112 based on the duty ratio signals, while the solenoid valve 155 is disposed between a hydraulic line 113 diverging from the line 112 and a hydraulic line 114 communicating with the drain through an orifice 114a, to control the flow of the hydraulic oil from the line 113 to the drain based on the duty signals.

Therefore, to the rod-side cylinder chamber 84 via the line 110 is applied the charge pressure regulated by the charge pressure relief valve 12, while to the head-side cylinder chamber 83 is applied a pressure from the line 112 lower than the charge pressure, by the action of the aforesaid two solenoid valves 155 and 156. In this connection, the force applied on the piston member 82 from the right side (that is, a force due to the hydraulic pressure Pu in the rod-side cylinder chamber 84 plus the force of the spring 87) balances with the force applied on the piston member 82 from the left side (that is, a force due to the hydraulic pressure P2 in the head-side cylinder chamber 83), even when P2 is lower than Pu, because the area of the rod-side cylinder chamber 84 subject to oil pressure is designed to be much smaller than that of the head-side cylinder chamber 83. Therefore, if the solenoid valves 155 and 156 control the hydraulic pressure (in the head-side cylinder chamber 83) supplied from the line 112 so as to be larger than the pressure P2, the piston member 82 will be moved to the right, while when the solenoid valves 155 and 156 control the hydraulic pressure in the head-side cylinder chamber 83 supplied from the line 112 so as to be smaller than the pressure P2, the piston member 82 will be moved to the left.

The movement of the piston member 82 to the left or right is transmitted to the clutch valve 5 through a link 88. The clutch valve 5 consists of a stationary member 5a having a first valve port 5b therein, and a rotary member 5c having a second valve port 5d rotatably inserted in the stationary member 5a. An arm 5e engaging with the rotary member 5c is connected to the aforesaid link 88, thus allowing a rotation of the rotary member 5c in accordance with the movement of the aforesaid piston member 82. When the rotary member 5c is rotated, the communication between the first and second valve ports 5b and 5d varies from "fully open" to "fully closed". When the piston member 82 is moved to the leftmost as shown in FIG. 2, the communication in the clutch valve 5 is "fully open", while as the piston member 82 moves to the right, the communication varies gradually to "fully closed".

Because the first valve port 5b communicates with the first line La and the second valve port 5d communicates with the second line Lb constituting the hydraulic closed-circuit, the variation in the communication between the aforesaid first and second valve ports 5b and 5d can change the opening degree of the seventh line Lg or the short circuit line of the first and second lines La and Lb, thus effecting clutch control. In other words, based on signal from the controller 100, duty-ratio control of aforesaid solenoid valves 155 and 156 can perform a successful clutch control.

The first and the second orifices 111a and 114a provided in the hydraulic lines 111 and 114, respectively, are also for securing fail safe in the case of a malfunction of the solenoid valves 156 and 155, similar in nature to the orifices 103a and 106a for the speed control servo units 30 and 50, respectively. For this purpose, the flow passage area $A_3$ of the first orifice 111a is made greater than the similar area $A_4$ of the second orifice 114a and the ratio of the two areas ($A_3/A_4$) can be set at a preferable value.

Therefore, when the two solenoid valves 155 and 156 become OFF simultaneously, the piston member 82 of the clutch servo unit 80 is slowly moved to the right by setting the ratio ($A_3/A_4$) such that the pressure $P_b$ in the hydraulic line 112 becomes a little higher than the pressure P2 at which the forces acting to the right and left are balanced (i.e., the force from oil pressure in the head-side cylinder and the pressure force plus the spring force on the rod-side cylinder are balanced). In such a case, the clutch valve 5 will be gradually closed for fail-safe even if the solenoid valves 155 and 156 for the clutch servo units 80 fail to operate during driving.

With the above unit, when the clutch valve 5 is closed making the clutch ON, as in the case of a solenoid valve malfunction, the vehicle can be stopped by selecting a neutral range and it can be run by selecting a running range. Alternatively, the clutch valve 5 may be fully opened to make the clutch OFF in case of malfunction and the brake is effected to stop the vehicle. To do this, the pressure $P_b$ in the hydraulic line 112 is set a little lower than the balancing pressure P2 so that piston member 82 is gradually moved to the left, thereby opening the clutch valve 5 slowly when the both of the solenoid valves 155 and 156 have become OFF.

Since in accordance with the above description the hydraulic servo units in a continuously variable speed transmission for controlling a speed reduction ratio and for controlling a clutch can each be controlled by means of only two duty-ratio-control solenoid valves, a control apparatus utilizing such servo units and consequently the continuously variable speed transmission as well, can be made compact and simple in structure, and their furthermore manufacturing cost can be reduced.

Figure 4:
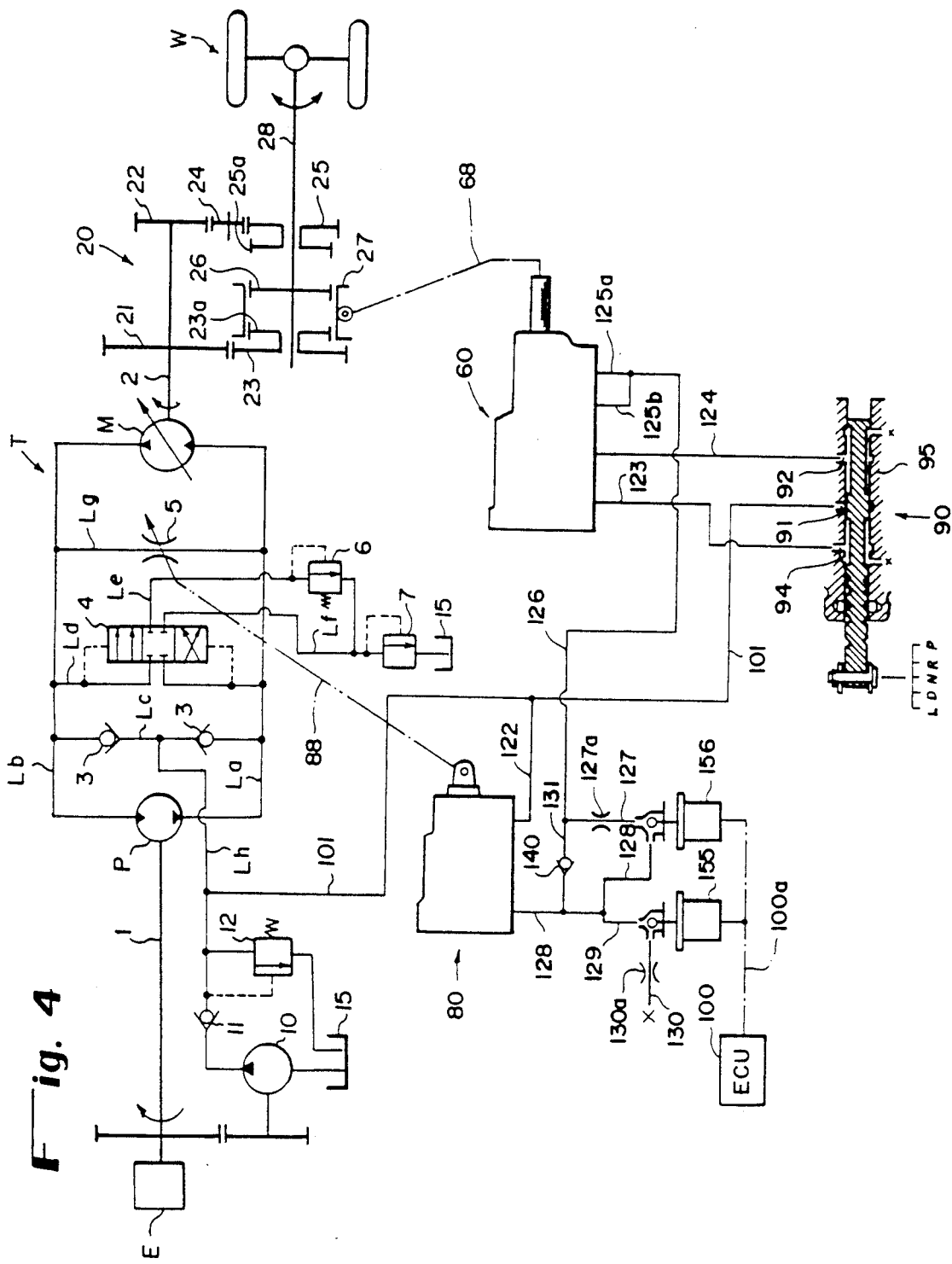
FIG. 4 is a schematic diagram of a hydraulic circuit used in a continuously variable speed transmission having control apparatus units according to the invention.

Other embodiments of the invention will now described, with reference to FIG. 4. FIG. 4 is a schematic diagram of the hydraulic circuit for a continuously variable speed transmission having a control apparatus according to the invention. The items and structure in FIG. 4 that are similar to those shown in FIG. 1 are numbered the same in FIG. 4 as in FIG. 1 and the descriptions thereof will not be repeated below.

An output shaft 28 connected to the wheels W is placed in parallel with the drive shaft 2 of the hydraulic motor M. A directional change gear unit 20 is placed between these two shafts 2 and 28. The gear unit 20 comprises a first drive gear 21 and a second drive gear 22 firmly mounted on the drive shaft 2 leaving an axial space therebetween, a first driven gear 23 rotatably mounted on the output shaft 28 and engaged with the first drive gear 21, a second driven gear 25 rotatably mounted on the output shaft 28 and engaged with a intermediate gear 24 which intermediate gear 24 is engaged with the second drive gear 22, a clutch hub 26 placed between the first and second driven gears 23, 25 and firmly mounted on the output shaft 28, and a sleeve 27 slidably mounted on the clutch hub 26 which sleeve 27 can be selectively engaged with the clutch gears 23a, 25a formed on the sides of the driven gears 23, 25, respectively. In the directional change gear unit 20, when the sleeve 27 is slided leftward, the clutch gear 23a of the first driven gear 23 is connected to the clutch hub 26 by means of the sleeve 27 (as shown in FIG. 1). Hence the rotational direction of the output shaft 28 is opposite to that of the drive shaft 2 and the wheels W are driven forward by the continuously variable speed transmission T. On the other hand, when the sleeve 27 is slided rightward, the clutch gear 25a of the second driven gear 25 is connected to the clutch hub 26 by means of the sleeve 27. Hence, the rotational direction of the output shaft 28 is the same as that of the drive shaft 2 and the wheels W are driven rearward.

Figure 5:
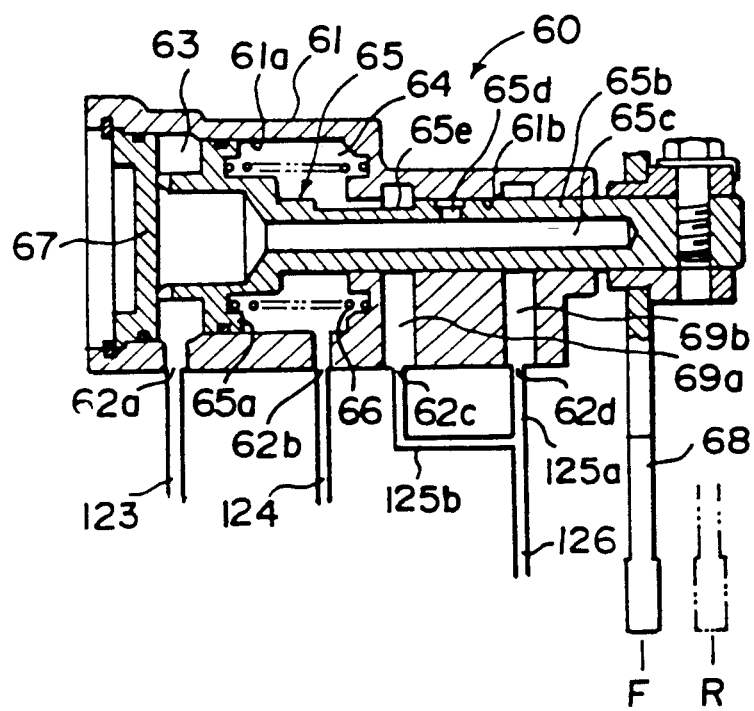
FIG. 5 is a cross sectional view of a directional control servo unit used in the above-mentioned continuously variable speed transmission.

The directional change servo unit 60 provides a directional change operation by sliding the sleeve 27 of said directional change gear unit 20 (See FIG. 5). The control of this directional change servo unit 60 is given by a manual valve (or shift valve) 90 which selectively supplies and extracts working fluid in association with the motion of the shift lever.

The directional change servo unit 60 comprises a housing 61 having four ports 62a, 62b, 62c, 62d with which four hydraulic lines 123, 124, 125b and 125a (shown in FIG. 4) are connected, and a spool member 65 which is slidably inserted in the housing 61 for longitudinal motion therein. The spool member 65 consists of a piston portion 65a and a rod portion 65b-extending rightward therefrom coaxially with the piston portion.

The piston portion 65a is inserted in the cylinder bore 61a which is formed in the housing 61 to extend longitudinally, and divide the cylinder chamber capped by the cover 67 into a left cylinder chamber 63 and right cylinder chamber 64. The rod portion 65b is inserted in a rod bore 61b which extends to the right coaxially with the cylinder bore 61a, the right end thereof extending out of the right end surface of the housing 61 and having a shift fork 68 mounted thereon which engages with the sleeve 27 of the directional change unit 20 to slidably shift the sleeve.

In the spool member 65 there is a communication bore 65c so formed as to axially extend and open at its left end to communicate with the left cylinder chamber 63. A valve bore 65d is also formed in the spool member, which valve bore 65d extends from the bore 65c to its opening on the outer surface of the rod portion 65b. The spool member 65 is biased to the left by a spring 66 mounted inside the right cylinder chamber 64.

The servo unit 60 having the above constitution is operated by means of a hydraulic pressure supplied in response to the operation of the manual valve 90 from the hydraulic lines 123 and 124 to the left and right hydraulic pressure chambers 63 and 64, respectively. The hydraulic line 123 communicates with the reverse port 94 of the manual valve 90 while the hydraulic line 124 communicates with the forward port 92 thereof. The manual valve 90 operates in accordance with the motion of the shift lever in the driver's compartment, which shift lever controls the motion of the spool 95. When the shift lever is positioned in the "D" or "L" range for forward running, the valve 90 connects the input port 91 with the forward port 92; when the shift lever is positioned in the "R" range, it connects the input port 91 with the reverse port 94; and in "N" range (neutral range), it shuts the input port 91 and connects the forward port 92 and the reverse port 94 with the drain. "D, L, R" ranges are referred to as running ranges.

The input port 91, via hydraulic line 101, communicates with charge hydraulic line Lh whose pressure is regulated by a charge pressure relief valve 12. Consequently, when the shift lever is in the forward range (D or L range), the reverse port 94 communicates with the drain in the manual valve 90, while the forward port 92 communicates with the input port 91. Then, the left cylinder chamber 63 of the directional change servo unit 60 communicates with the drain, and to the right chamber 64 is supplied the charge pressure from the charge hydraulic line Lh. As a result the hydraulic pressure in the right cylinder chamber 64 forces the spool member 65 to the left, the shift fork 68 to the left, and also the sleeve 27 (FIG. 4) engaging therewith to the left, thereby setting the directional change gear unit 20 at forward range. The right cylinder chamber 64 then communicates via a notch 65e of the spool member 65, with a (communication) line 69a communicating with the port 62c, so that the hydraulic pressure in the right cylinder chamber 64 (change hydraulic pressure) is also supplied from the port 62c to the hydraulic pressure line 126 through the hydraulic line 125b.

As the shift lever is shifted to "N" position, the input port 91 is shut and other ports 92, 93, and 94 are connected with the drain (shown in FIG. 4). The hydraulic pressures in the right and left cylinder chambers 63 and 64 of the directional change unit fall to "0", but the spool member 65 is held in the left biased position by the biasing force of the spring 66, which retains the directional change gear unit in the forward condition. The hydraulic pressure in the hydraulic line 126 is also "0".

When the shift lever is shifted to "R", the input port 91 communicates with the reverse port 94, while other ports 92 and 93 remains to communicate with the drain. Under such conditions, to the left cylinder chamber 63 is provided the hydraulic pressure from charge hydraulic line Lh, and, since the right cylinder chamber 64 communicates with the drain, the spool member 65 is moved to the right and the shift fork 68 is also moved to the right to move the sleeve 27 to the right, resulting in the switching of the gears in the directional change unit 20 from a forward to a rearward driving arrangement. The valve port 65d of the spool member 65 has an opening in the communication line 69b connected with the port 62d. The hydraulic pressure in the left cylinder chamber 63 (charge hydraulic pressure) is also supplied via the hydraulic line 126 to the communication bore 65c, valve bore 65d, communication line 69b and the hydraulic pressure line 125a.

Figure 6:
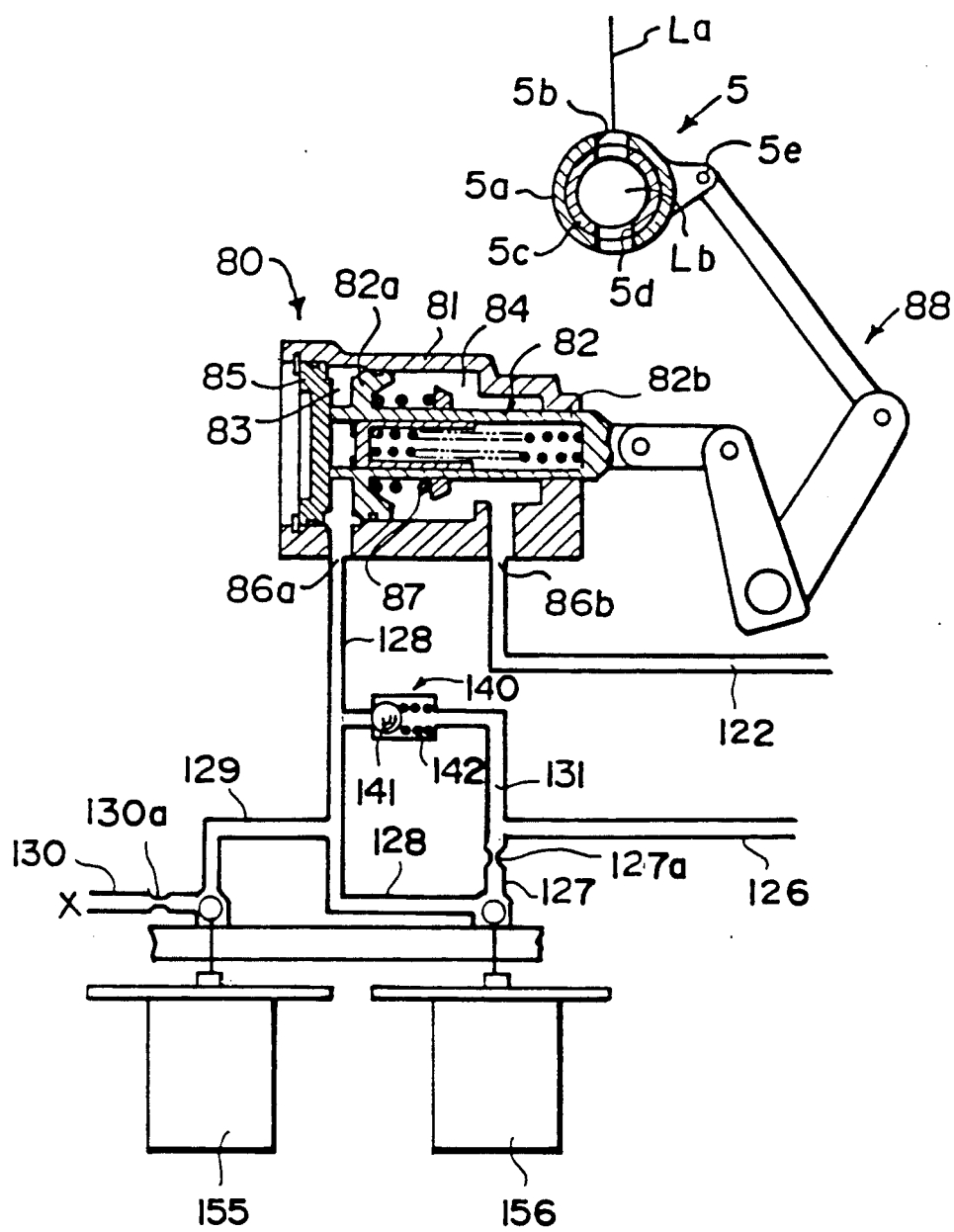
FIG. 6 is a cross sectional view of a clutch servo unit for the above-mentioned continuously variable speed transmission.
Figure 7A:
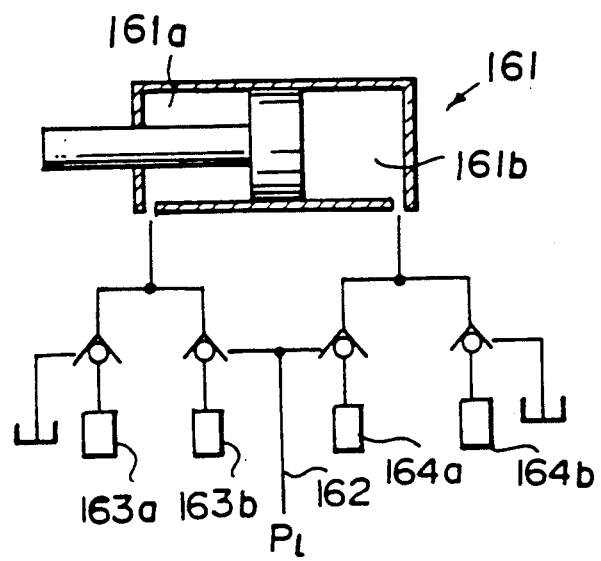
FIGS. 7A and 7B are schematic diagrams of hydraulic circuits for servo units according to the prior art.
Figure 7B:
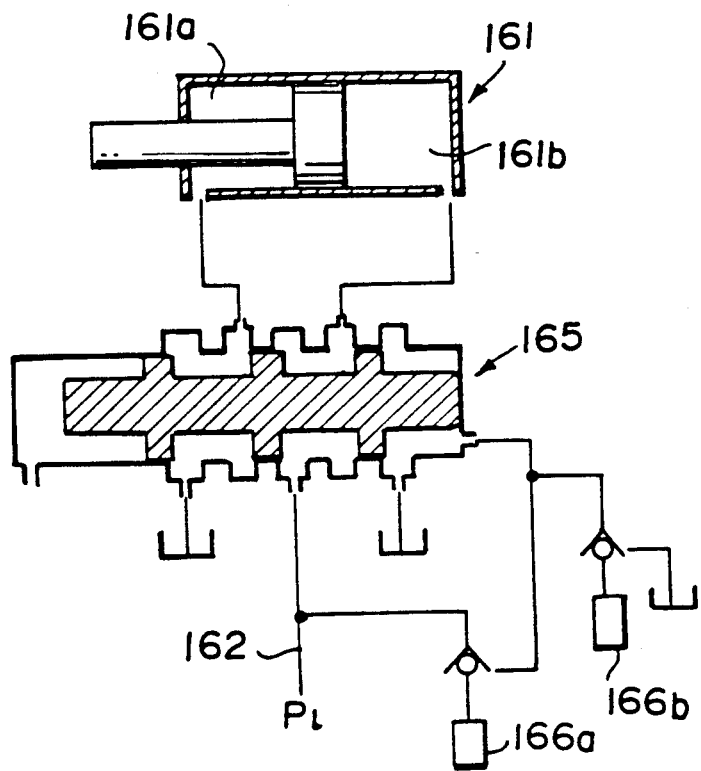

The operation control of the clutch valve 5 is given by the clutch servo unit 80 shown in FIG. 6. The operation of the clutch servo unit 80 is controlled by a pair of solenoid valves 155 and 156 whose duty ratios are in turn controlled in response to signals given by the controller 100. The controller 100 receives signals representing vehicle speed V, rotational engine speed Ne, throttle opening $\theta$th, inclination angle $\theta$tr of the hydraulic motor M, and accelerator opening $\theta$acc, and generates signals to control said solenoid valves 155 and 156 so that desired driving control can be attained. The clutch servo unit 80 shown in FIG. 6 has the same structure as the shown in FIG. 3, wherein the head-side cylinder chamber 83 is connected with the hydraulic line 128 and the rod-side cylinder chamber 84 with the hydraulic line 122. The hydraulic line 122 branches from the hydraulic line 101 and communicates with the charge hydraulic line Lh, to which the charge pressure regulated by a charge pressure relief valve 12 is supplied. The hydraulic pressure in the hydraulic line 128 is obtained by controlling the pressure supplied from the hydraulic line 127 having an orifice 127a, which branches from said hydraulic line 126, by the first and second solenoid valves 155 and 156 which are under duty ratio control. The first solenoid valve 156 is for controlling the flow rate of the working fluid passing from the hydraulic line 127 having orifice 127a to the hydraulic line 128 in accordance with the duty ratio. The second solenoid valve 155, arranged between the hydraulic line 129 which branches from the hydraulic line 128 and the hydraulic line 130 that communicates with the drain via an orifice 130a, controls the outgoing flow of the oil from the hydraulic line 129 to the drain in accordance with the duty ratio. From the hydraulic line 126 branches a hydraulic line 131 which communicates with the hydraulic line 128. The hydraulic line 131 is provided with a check valve 140 consisting of a ball 21 and a spring 22 which permits the flow from the hydraulic line 128 to the hydraulic line 126, but prohibits a flow in the opposite direction.

Therefore, the rod-side cylinder chamber 84 is always supplied with charge hydraulic pressure from the hydraulic line 101 and 122. On the other hand, when the running range is selected in the transmission, the head-side cylinder chamber 83 is supplied with a charge hydraulic pressure through the hydraulic line 126 by means of the manual valve 90, but is not supplied with the charge hydraulic pressure when the transmission is in the neutral range, making the hydraulic pressure in the head-side cylinder chamber 83 zero. Furthermore, even when the transmission is in the running range, the head-side cylinder chamber 83 is not supplied with the charge hydraulic pressure in the hydraulic line 126 directly, but supplied with the pressure only after it is reduced to the pressure lower than the charge pressure by the first and second solenoid valves 155 and 156.

The area of the piston portion 82a to which pressure is applied is smaller in the rod-side cylinder chamber 84 than in the head-side cylinder chamber 83, so that the forces acting on the piston due to the pressures in chambers 83 and 84 and the biasing force of the spring 87 are balanced when the hydraulic pressure P2 in the head-side cylinder chamber 83 is lower than the pressure Pu in the rod-side cylinder chamber 84 (Pu>P2). Consequently, by raising the hydraulic pressure supplied from the hydraulic line 128 to the head-side cylinder chamber 83 higher than P2, piston member 82 can be moved to the right, while by reducing the pressure supplied at the head-side cylinder chamber 83 lower than P2 the piston member 82 can be moved to the left.

The rightward and leftward motion of the piston member 82 is transmitted to the clutch valve 5 through the link mechanism 88, providing clutch control. The constitution of the clutch valve 5 is the same as the one shown in FIG. 3, and its description will therefore not be repeated here.

The lockout feature of the invention will now be discussed. When the shift lever is in the "D" or the "L" position, the hydraulic line 123 is connected through the valve 90 to the drain. The left cylinder chamber 63 is connected to the drain through the hydraulic line 123 and the spool member 65 is shifted to the left under the force of the spring 66. The line 69b is cut off from the bore 65c by the spool member 65. The right cylinder chamber 64 communicates with the hydraulic line 126 through the notch 65e, the line 69a, the port 62c, and the hydraulic line 125b, thus connecting the line 124 with the hydraulic line 126. The line 124 is connected through the valve 90 to the charge hydraulic line Lh via the hydraulic line 101. In this manner, the hydraulic line 127 is connected to the charge hydraulic line Lh, and pressurized hydraulic fluid is available for clutch control. As discussed above, hydraulic fluid under pressure may be provided to the head-side cylinder chamber 83 in order to operate the clutch valve 5 to close the line Lg.

When the shift lever is moved from the "D" or the "L" position to the "R" position the shift lever moves through the "N" position. As discussed above, when the shift lever is maintained in the "N" position, the hydraulic pressure in the head-side chamber 83 is set to zero. However, it is possible to operate the shift lever very quickly so that the time that the shift lever spends in the "N" position while moving from the "D" or the "L" position to the "R" position is very small. Nevertheless, the lockout feature of the invention will cause the pressure in the head-side chamber to fall to zero before the gear unit 20 is shifted into a reverse state.

When the shift lever is moved to the "R" position from the "D" position, initially the spool member 65 is in the left position, as just discussed. Moving the shift lever into the "R" position causes the line 123 to be connected through the valve 90 to the charge hydraulic line Lh via the hydraulic line 101. The line 124 and the right cylinder chamber 64 are connected to the drain through the valve 90. When the line 123 is connected to the charge hydraulic line Lh, the left cylinder chamber 63 receives oil under pressure and the spool member 65 begins to move to the right. However, since when the shift lever is first moved into the "R" position the spool member 65 is positioned to the left, then the head-side cylinder chamber 83 is connected to the drain through the check valve 140 in the hydraulic line 131, the line 126, the line 125b, the port 62c, the line 69a, the notch 65e, the right cylinder chamber 64, the port 62b, the line 124, and the valve 90. In this manner, the clutch valve 5 is operated to open the line Lg during the shifting operation. This condition of the head-side cylinder 83 being connected to the drain continues until the shifting operation is essentially complete (i.e., until the spool member 65 has traveled sufficiently to the right to block the notch 65e). When the shifting operation is complete, the change gear unit is in a reverse gear state and the head-side chamber 83 is connected to the charge hydraulic line Lh via the line 126, the port 62d, the line 69b, the valve bore 65d, the bore 65c, the left cylinder chamber 63, the line 123, the valve 90, and the line 101. Also, at this time, the head-side chamber 83 is cut off from the drain by the blocking of the notch 65e. Thus, oil under pressure is again available in the line 127 for selective provision to the head-side chamber 83.

A similar interlock operation occurs when the shift lever is moved from the "R" position to either of the "D" and "L" positions. In this case, if the shift lever is moved quickly, the spool member 65 may be in a right position when the shift lever is first moved into one of the "D" and "L" positions. However, when the shift lever is in the "D" or the "L" position, the shift valve 90 connects the line 123 with the drain and connects the line 124 with the charge hydraulic line Lh via the hydraulic line 101. This connects the left cylinder chamber 63 with the drain and connects the right cylinder chamber 64 with the charge hydraulic line Lh. As a result, the spool member 65 begins to move to the left to shift the change gear unit 20 into a forward gear state. However, since initially the spool member 65 is positioned to the right, the head-side cylinder chamber 83 is initially connected to the drain through the line 131, the line 126, the line 125a, the port 62d, the line 69b, the valve bore 65d, the bore 65c, the left cylinder chamber 63, the line 123, and the valve 90. This causes the head-side cylinder chamber 83 to be drained and causes the clutch valve 5 to operate to open the line Lg at the beginning of the operation of shifting the change gear unit 20 into a forward gear state. When the shifting is complete, the conditions return to a state in which the spool member 65 is positioned to the left, the valve bore 65d is cut off, the notch 65e is open, and the line 127 is connected to the charge hydraulic line Lh via the hydraulic line 101.

The operation of such a continuously variable speed transmission will now be described. When the manual valve 90 is in the neutral position as set by the shift lever, the hydraulic pressures in the hydraulic lines 123, 124 and 126 are all zero, so that the spool member 65 of the directional servo unit 60 is shifted leftward by the action of the spring 66 to set the directional change gear unit 20 at the forward position, and also the piston member 82 of the clutch servo unit 80 is shifted leftward to fully open the clutch valve 5. Under this condition, the hydraulic motor M is not rotated and remains neutral even while the hydraulic pump P is driven by the engine E.

As the manual valve 90 is switched from the above range to, for the "D" range (by means of the shift lever), the charge hydraulic pressure is supplied to the hydraulic lines 124 and 126. Upon this switching, although the directional change gear unit 20 remains at the forward position, the head-side cylinder chamber 83 of the clutch servo unit 80 is provided with a pressure that is determined by the solenoid valves 155 and 156, and as a result the opening control of the clutch valve 5 occurs.

The opening control of the clutch valve 5 is to permit the smooth starting and stopping of the vehicle. This may be done, for example, by establishing reference clutch openings in relation to the engine throttle opening and the vehicle speed, and by giving the first and second solenoid valves 155 and 156 a duty ratio signal supplied by the controller 100 such that the reference clutch opening can be obtained corresponding to the actual throttle opening and vehicle speed.

When the shift range is "D" under the controlled opening of the clutch valve 5, the clutch valve 5 is opened to prevent engine stalling if the acceleration pedal is not depressed, leaving the engine idling. As the acceleration pedal is thereafter depressed, the opening control of the clutch valve 5 is carried out as described above to turn the clutch ON, and the vehicle will be started (and put into a running condition). In stopping the vehicle, as the vehicle speed becomes lower than a predetermined speed, the controller generates a signal which is transmitted to the solenoid valves 155 and 156 for opening the clutch valve 5 to turn the clutch OFF. When the vehicle is at a halt, the clutch is set OFF (by opening the clutch valve 5) to thereby prevent engine stall.

However, if the solenoid valves 155 and 156 stop their operation on account of a malfunction, for example of the controller 100, or a sticking of the spools of the solenoid valves 155 and 156 during running while they are in ON condition, the fluid in the head-side cylinder chamber 83 is trapped and the clutch valve 5 is shut, leaving the clutch ON. If the vehicle is stopped with the clutch left in this condition, the engine suffers from an over-load since the engine tends to drive the wheels through the continuously variable speed transmission T, and finally incurs engine stall. In this case, the ball 141 is pushed by the charge hydraulic pressure in the hydraulic line 126 so that the check valve 140 remains shut and the fluid is not let out through the hydraulic line 131.

Nevertheless, in the event that both of the solenoid valves 155 and 156 malfunction in an ON state, if the manual valve 90 is switched to the neutral range by shifting the shift lever, the hydraulic line 126 communicates with the drain, thereby releasing the ball 141 of the check valve 140 due to the force of the hydraulic pressure in the head-side cylinder chamber 83 acting on the check valve 140 overcoming the force due to the spring 22 and the fluid in the head-side cylinder chamber 83 is exhausted into the drain through the hydraulic line 131. At the same time, because of the hydraulic pressure in the rod-side cylinder chamber 84, the piston member 82 is moved to the left to fully open the clutch valve 5. Thus, in the case of a simultaneous failure of the solenoid valves 155 and 156 in which the valves 155 and 156 remain in an ON state, engine stall can be avoided by moving the shift lever into the neutral range to thereby make the clutch OFF.

Although the invention has been described above for the control of a clutch servo valve used with a continuously variable speed transmission, it is not limited thereto, but may be utilized equally well for controlling clutches of transmissions of different types by means of the servo valves according to the invention.

As has been described above, when the first and second solenoid valves have failed simultaneously by remaining in an ON state, with a resultant failure to control the clutch servo valve units, the working fluid is trapped in the head-side cylinder chamber and the servo cylinder is immobilized as it is. However, by operating the shift lever from the running range to neutral range, the second hydraulic line on the side of the pressure supply source is shut, the second hydraulic line on the side of the branching portion is adapted to communicate with the drain by means of the shift valve (i.e. manual valve), and the head-side cylinder chamber communicates by the action of the check valve with the drain through the branching hydraulic line and the shift valve, thus permitting the servo valve to move, making the clutch turned OFF to thereby avoid a stalling of the engine.

The invention being thus described, it will be apparent that the invention may be varied in many ways. Such variations are not to be regarded as a departure from the spirit and scope of the invention, and all such modifications as would be apparent to one skilled in the art are intended to be included within the scope of the following claims.

What is claimed is:

1. In a hydraulic servo unit comprising a cylinder and a piston inserted in a chamber formed in said cylinder, said piston having a piston portion which is slidably inserted in said cylinder chamber and a rod portion with one end thereof being integral with said piston portion and the other end thereof extending out of said cylinder chamber, said cylinder chamber being divided by said piston portion into a rod-side cylinder chamber through which said piston rod penetrates and a head-side cylinder chamber to which an end surface of said piston portion faces, a pressure-receiving area of said head-side cylinder chamber being greater than a pressure-receiving area of said rod-side cylinder chamber;

a control apparatus for said hydraulic servo unit comprising:

a first hydraulic line for supplying a working fluid of a predetermined pressure from a hydraulic pressure source to said rod-side cylinder chamber;

a first solenoid valve whose opening is controlled in accordance with duty-ratio signals;

a second hydraulic line connecting said head-side cylinder chamber with said first hydraulic line through said first solenoid valve;

a second solenoid valve whose opening is controlled in accordance with duty-ratio signals; and a drain hydraulic line connecting said head-side cylinder chamber with a drain through said second solenoid valve, wherein a first orifice having a predetermined fixed flow passage area is provided in said second hydraulic line, and a second orifice having a predetermined fixed flow passage area smaller than said area of the first orifice is provided in said drain hydraulic line.

2. A control apparatus as defined in claim 1, wherein said hydraulic servo unit is used for controlling the speed reduction ratio of a continuously variable speed transmission.

3. A control apparatus as defined in claim 1, wherein said hydraulic servo unit is used for controlling the clutch of a continuously variable speed transmission.

4. In a hydraulic servo unit comprising a cylinder and a piston inserted in a chamber formed in said cylinder, said piston having a piston portion which is slidably inserted in said cylinder chamber and a rod portion with one end thereof being integral with said piston portion and the other end thereof extending out of said cylinder chamber, said cylinder chamber being divided by said piston portion into a rod-side cylinder chamber through which said piston rod penetrates and a head-side cylinder chamber to which an end surface of said piston portion faces, a pressure-receiving area of said head-side cylinder chamber being greater than a pressure-receiving area of said rod-side cylinder chamber;
a control apparatus for said hydraulic servo unit comprising:
a first hydraulic line means for supplying a working fluid of a predetermined pressure from a hydraulic pressure source to said rod-side cylinder chamber;
a first solenoid valve whose opening is controlled in accordance with duty-ratio signals;
a second hydraulic line means for connecting said head-side cylinder chamber with said first hydraulic line means through said first solenoid valve;
a second solenoid valve whose opening is controlled in accordance with duty-ratio signals;
a drain hydraulic line connecting said head-side cylinder chamber with a drain through said second solenoid valve; and
a shift valve provided in said second hydraulic line means between said first hydraulic line means and said first solenoid valve;
wherein said shift valve shuts the second hydraulic line means on a side of said first hydraulic line means and connects the second hydraulic line means on a side of said first solenoid valve with a drain when a neutral range is selected, but allows working fluid to flow from said first hydraulic line means through said second hydraulic line means when a running range is selected.

5. In a hydraulic servo unit comprising a cylinder and a piston inserted in a chamber formed in said cylinder, said piston having a piston portion which is slidably inserted in said cylinder chamber and a rod portion with one end thereof being integral with said piston portion and the other end thereof extending out of said cylinder chamber, said cylinder chamber being divided by said piston portion into a rod-side cylinder chamber through which said piston rod penetrates and a head-side cylinder chamber to which an end surface of said piston portion faces, a pressure-receiving area of said head-side cylinder chamber being greater than a pressure-receiving area of said rod-side cylinder chamber;
a control apparatus for said hydraulic servo unit comprising:
a first hydraulic line for supplying a working fluid of a predetermined pressure from a hydraulic pressure source to said rod-side cylinder chamber;
a first solenoid valve whose opening is controlled in accordance with duty-ratio signals;
a second hydraulic line connecting said head-side cylinder chamber with said first hydraulic line through said first solenoid valve;
a second solenoid valve whose opening is controlled in accordance with duty-ratio signals;
a drain hydraulic line connecting said head-side cylinder chamber with a drain through said second solenoid valve;
a hydraulic branch line one end of which is connected with a portion of said second hydraulic line between said hydraulic pressure source and said first solenoid valve, and the other end of which is connected with said head-side cylinder chamber;
a check valve provided in said hydraulic branch line for permitting the working fluid to flow only from said head-side cylinder chamber into said second hydraulic pressure line at a point by-passing the first solenoid valve and not from said second hydraulic pressure line by-passing said first solenoid valve through said hydraulic branch line into said head-side cylinder; and
a shift valve provided in a portion of said second hydraulic line between said hydraulic pressure source and a branching point of said branch line;
wherein said shift valve shuts the second hydraulic line on a side of said hydraulic pressure source and connects the second hydraulic line on a side of said branching point with a drain when a neutral range is selected, but allows working fluid to flow from said hydraulic pressure source through said second hydraulic line when a running range is selected.

6. A control apparatus for a hydraulic servo unit with a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, and a rod integral with said piston on the side of the piston facing into the rod-side chamber, said rod extending out of said cylinder, comprising, first hydraulic line means for supplying a working fluid of a predetermined pressure to said rod-side chamber, first solenoid means for opening and closing a first valve in accordance with duty-ratio control signals, second hydraulic line means for connecting said head-side chamber with said first hydraulic line means through said first solenoid means, second solenoid means for opening and closing a second valve in accordance with duty-ratio control signals, control means for supplying said duty-ratio control signals, drain means for connecting said head-side cylinder chamber with a drain through said second solenoid means, and a first restriction in said second hydraulic line means and a second restriction in said drain means, said first restriction having a first predetermined fixed flow area and said second restriction having a second predetermined fixed flow area.

7. A control apparatus according to claim 6, wherein said first predetermined fixed flow area is greater than said second predetermined fixed flow area.

8. A control apparatus according to claim 7, wherein the area of said first pressure-bearing surface is greater than the area of said second pressure-bearing surface.

9. A control apparatus according to claim 8, wherein said hydraulic servo unit is used in a continuously variable transmission for controlling the speed reduction ratio of said transmission according to the position of said rod as said piston is slidably operated in said cylinder.

10. A control apparatus according to claim 8, wherein said rod is operatively connected to a hydraulically operated continuously variable transmission for controlling the speed reduction ratio of said continuously variable transmission.

11. A control apparatus according to claim 8, wherein said rod is operatively connected to a swash plate in a hydraulically operated continuously variable transmission for controlling the position of said swash plate.

12. A control apparatus according to claim 8, wherein said hydraulic servo unit is used in a continuously variable transmission for controlling a clutch of said transmission according to the position of said rod as said piston is slidably operated in said cylinder.

13. A control apparatus according to claim 8, wherein said rod is operatively connected to a hydraulically operated continuously variable transmission for controlling a clutch of said continuously variable transmission.

14. A control apparatus according to claim 6, wherein the area of said first pressure-bearing surface is greater than the area of said second pressure-bearing surface.

15. A control apparatus according to claim 14, wherein said hydraulic servo unit is used in a continuously variable transmission for controlling the speed reduction ratio of said transmission according to the position of said rod as said piston is slidably operated in said cylinder.

16. A control apparatus according to claim 14, wherein said rod is operatively connected to a hydraulically operated continuously variable transmission for controlling the speed reduction ratio of said continuously variable transmission.

17. A control apparatus according to claim 14, wherein said rod is operatively connected to a swash plate in a hydraulically operated continuously variable transmission for controlling the position of said swash plate.

18. A control apparatus according to claim 14, wherein said hydraulic servo unit is used in a continuously variable transmission for controlling a clutch of said transmission according to the position of said rod as said piston is slidably operated in said cylinder.

19. A control apparatus according to claim 14, wherein said rod is operatively connected to a hydraulically operated continuously variable transmission for controlling a clutch of said continuously variable transmission.

20. A control apparatus for a hydraulic servo unit with a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, and a rod integral with said piston on the side of the piston facing into the rod-side chamber, said rod extending out of said cylinder, comprising, first hydraulic line means for supplying a working fluid of a predetermined pressure to said rod-side chamber, first solenoid means for opening and closing a first valve in accordance with duty-ratio control signals, second hydraulic line means for connecting said head-side chamber with said first hydraulic line means through said first solenoid means, second solenoid means for opening and closing a second valve in accordance with duty-ratio control signals, control means for supplying said duty-ratio control signals, drain means for connecting said head-side cylinder chamber with a drain through said second solenoid means, wherein the area of said first pressure-bearing surface is greater than the area of said second pressure-bearing surface, and shifting means for shifting a transmission apparatus of a vehicle between a running range and a non-running range, said shifting means being provided in said second hydraulic line means between said first hydraulic line means and said first solenoid means, wherein said shifting means shuts the second hydraulic line means on a side of said first hydraulic line means and connects said second hydraulic line means on a side of said first solenoid means with a drain when a neutral range is selected, but allows working fluid to flow from said first hydraulic line means through said second hydraulic line means when a running range is selected.

21. A control apparatus according to claim 20, wherein said shifting means comprises a valve and a shifting cylinder connected to said valve, said shifting cylinder having a piston slidable in said cylinder with a shifting rod integral with said piston, said rod being operatively connected to a gear for shifting said transmission apparatus.

22. A control apparatus for a hydraulic servo unit with a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, and a rod integral with said piston on the side of the piston facing into the rod-side chamber, said rod extending out of said cylinder, comprising, first hydraulic line means for supplying a working fluid of a predetermined pressure to said rod-side chamber, first solenoid means for opening and closing a first valve in accordance with duty-ratio control signals, second hydraulic line means for connecting said head-side chamber with said first hydraulic line means through said first solenoid means, second solenoid means for opening and closing a second valve in accordance with duty-ratio control signals, control means for supplying said duty-ratio control signals, drain means for connecting said head-side cylinder chamber with a drain through said second solenoid means, wherein the area of said first pressure-bearing surface is greater than the area of said second pressure-bearing surface, and a shift valve provided in said second hydraulic line means between said first hydraulic line means and said first solenoid means, wherein said shift valve blocks communication between the second hydraulic line means and said first hydraulic line means and connects said second hydraulic line means and said first solenoid means with a drain when a neutral range is selected, but allows working fluid to flow from said first hydraulic line means through said second hydraulic line means when a running range is selected.

23. A control apparatus for a hydraulic servo unit with a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, and a rod integral with said piston on the side of the piston facing into the rod-side chamber, said rod extending out of said cylinder, comprising, first hydraulic line means for supplying a working fluid of a predetermined pressure to said rod-side chamber, first solenoid means for opening and closing a first valve in accordance with duty-ratio control signals, second hydraulic line means for connecting said head-side chamber with said first hydraulic line means through said first solenoid means, second solenoid means for opening and closing a second valve in accordance with duty-ratio control signals, control means for supplying said duty-ratio control signals, drain means for connecting said head-side cylinder chamber with a drain through said second solenoid means, wherein the area of said first pressure-bearing surface is greater than the area of said second pressure-bearing surface, a hydraulic branch line one end of which is connected with a portion of said second hydraulic line means between a pressure source of said working fluid and said first solenoid means, and the other end of which is connected with said head-side chamber, a check valve provided in said hydraulic branch line for permitting the working fluid to flow only from said head-side chamber into said second hydraulic line means and not from said second hydraulic line means through said hydraulic branch line into said head-side chamber, and a shift valve provided in a portion of said second hydraulic line means between said pressure source and a branching point of said branch line, wherein said shift valve disconnects said second hydraulic line means from said pressure source and connects said second hydraulic line means on a side of said branching point with a drain when a neutral range is selected, but allows working fluid to flow from said pressure source through said second hydraulic line means when a running range is selected.

24. A control apparatus for a hydraulic servo unit with a cylinder, a cylinder chamber in said cylinder, a piston having a piston portion slidably inserted in said cylinder chamber and a rod portion with one end integral with said piston portion and another end extending out of said cylinder chamber, said cylinder chamber being divided by said piston portion into a rod-side cylinder chamber through which said piston rod penetrates and a head-side cylinder chamber into which an end surface of said piston portion faces, said end surface facing into said head-side cylinder chamber with a first pressure-bearing surface, said piston portion having a second pressure-bearing surface facing into said rod-side cylinder chamber, said first pressure-bearing surface being greater in area than said second pressure-bearing surface, comprising, first hydraulic line means for supplying a working fluid of a predetermined pressure to said rod-side cylinder chamber, first solenoid means for opening and closing a first valve in accordance with duty-ratio signals, second hydraulic line means for connecting said head-side cylinder chamber with said first hydraulic line means through said first solenoid means, second solenoid means for opening and closing a second valve in accordance with duty-ratio signals, control means for supplying said duty-ratio signals to control said first and second solenoid means, drain means for connecting said head-side cylinder chamber with a drain through said second solenoid means, and a shift valve provided in said second hydraulic line means between said first hydraulic line means and said first solenoid means, wherein said shift valve shuts said second hydraulic line means on a side of said first hydraulic line means and connects said second hydraulic line means on a side of said first solenoid means with a drain when a neutral range is selected, but allows working fluid to flow from said first hydraulic line means through said second hydraulic line means when a running range is selected.

25. A control apparatus for a hydraulic servo unit with a cylinder, a cylinder chamber in said cylinder, a piston having a piston portion slidably inserted in said cylinder chamber and a rod portion with one end integral with said piston portion and another end extending out of said cylinder chamber, said cylinder chamber being divided by said piston portion into a rod-side cylinder chamber through which said piston rod penetrates and a head-side cylinder chamber into which an end surface of said piston portion faces, said end surface facing into said head-side cylinder chamber with a first pressure-bearing surface, said piston portion having a second pressure-bearing surface facing into said rod-side cylinder chamber, said first pressure-bearing surface being greater in area than said second pressure-bearing surface, comprising, first hydraulic line means for supplying a working fluid of a predetermined pressure to said rod-side cylinder chamber, first solenoid means for opening and closing a first valve in accordance with duty-ratio signals, second hydraulic line means for connecting said head-side cylinder chamber with said first hydraulic line means through said first solenoid means, second solenoid means for opening and closing a second valve in accordance with duty-ratio signals, control means for supplying said duty-ratio signals to control said first and second solenoid means, drain means for connecting said head-side cylinder chamber with a drain through said second solenoid means, a hydraulic branch line one end of which is connected with a portion of said second hydraulic line means between a pressure source of said working fluid and said first solenoid means, and the other end of which is connected with said head-side chamber, a check valve provided in said hydraulic branch line for permitting the working fluid to flow only from said head-side chamber into said second hydraulic line means and not from said second hydraulic line means through said hydraulic branch line into said head-side chamber, and a shift valve provided in a portion of said second hydraulic line means between said pressure source and a branching point of said branch line, wherein said shift valve disconnects said second hydraulic line means from said pressure source and connects said second hydraulic line means on a side of said branching point with a drain when a neutral range is selected, but allows working fluid to flow from said pressure source through said second hydraulic line means when a running range is selected.

26. A control apparatus for a hydraulic servo unit with a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, and a rod integral with said piston on the side of the piston facing into the rod-side chamber, said rod extending out of said cylinder, comprising, biasing means for biasing said piston toward said head-side chamber, first hydraulic line means for supplying a working fluid of a predetermined pressure to said rod-side chamber, first solenoid means for opening and closing a first valve in accordance with duty-ratio control signals, second hydraulic line means for connecting said head-side chamber with said first hydraulic line means through said first solenoid means, second solenoid means for opening and closing a second valve in accordance with duty-ratio control signals, control means for supplying said duty-ratio control signals, and drain means for connecting said head-side cylinder chamber with a drain through said second solenoid means, and a first restriction in said second hydraulic line means and a second restriction in said drain means, said first restriction having a first predetermined fixed flow area and said second restriction having a second predetermined fixed flow area.

27. A control apparatus according to claim 26, wherein said first predetermined flow area is greater than said second predetermined flow area.

28. A control apparatus according to claim 27, wherein said rod is operatively connected to a clutch in a hydraulically operated continuously variable transmission to control the operation of said clutch.

29. A control apparatus according to claim 26, wherein said rod is operatively connected to a clutch in a hydraulically operated continuously variable transmission to control the operation of said clutch.

30. A control apparatus according to claim 26, wherein said biasing means comprises a spring.

31. A control apparatus according to claim 26, further comprising a second cylinder in said piston, a second piston slidably fitted in said second cylinder, said second piston having a cylinder pressure bearing surface facing into said head-side chamber, and second biasing means for biasing said second piston toward said head-side chamber.

32. A control apparatus according to claim 31, wherein said second biasing means comprises a spring.

33. A control apparatus according to claim 26, further comprising third hydraulic line means for selectively connecting said first hydraulic line means to said second hydraulic line means, said third hydraulic line means being connected to said first hydraulic line means between said first solenoid means and a pressure source, and valve means in said third hydraulic line means for allowing said working fluid to flow from said head-side chamber to said first hydraulic line means and also for preventing the flow of working fluid from said first hydraulic line means to said second hydraulic line means through said third hydraulic line means.

34. A control apparatus for a hydraulic servo unit with a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, and a rod integral with said piston on the side of the piston facing into the rod-side chamber, said rod extending out of said cylinder, comprising, biasing means for biasing said piston toward said head-side chamber, first hydraulic line means for supplying a working fluid of a predetermined pressure to said rod-side chamber, first solenoid means for opening and closing a first valve in accordance with duty-ratio control signals, second hydraulic line means for connecting said head-side chamber with said first hydraulic line means through said first solenoid means, second solenoid means for opening and closing a second valve in accordance with duty-ratio control signals, control means for supplying said duty-ratio control signals, drain means for connecting said head-side cylinder chamber with a drain through said second solenoid means, a first restriction in said second hydraulic line means and a second restriction in said drain means, said first restriction having a first predetermined fixed flow area and said second restriction having a second predetermined fixed flow area, said first predetermined fixed flow area being greater than said second predetermined fixed flow area, third hydraulic line means for selectively connecting said first hydraulic line means to said second hydraulic line means, said third hydraulic line means being connected to said first hydraulic line means between said first solenoid means and a pressure source, and valve means in said third hydraulic line means for allowing said working fluid to flow from said head-side chamber to said first hydraulic line means and also for preventing the flow of working fluid from said first hydraulic line means to said second hydraulic line means through said third hydraulic line means.

35. A control apparatus in a hydraulically operated continuously variable transmission with a hydraulic motor and a hydraulic pump interconnected by a closed hydraulic circuit, and a clutch in said transmission, comprising, a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, a rod integral with said piston on the side of the piston facing into the rod-side chamber, said rod extending out of said cylinder and being operatively connected to said clutch for operating said clutch according to the position of said piston in said cylinder, biasing means for biasing said piston toward said head-side chamber, first hydraulic line means for supplying a working fluid of a predetermined pressure to said rod-side chamber, second hydraulic line means for supplying a working fluid of a second pressure to said head-side chamber, valve means to regulate the second pressure, and shift means for disconnecting said second hydraulic line means from a pressure source and connecting said second hydraulic line means with a drain when a neutral range is selected, but allowing working fluid to flow from said pressure source through said second hydraulic line means when a running range is selected.

36. A control apparatus according to claim 35, wherein when said neutral range is selected said clutch is operated so as to prevent the operation of said hydraulic motor by working fluid from said hydraulic pump.

37. A control apparatus according to claim 35, wherein said first pressure is substantially constant.

38. A control apparatus according to claim 35, wherein when said second pressure is decreased, said rod is moved in a direction to operate said clutch to interrupt the transmission of power from said hydraulic pump to said hydraulic motor.

39. A control apparatus according to claim 35, wherein said valve means comprises a first solenoid valve whose opening is controlled in accordance with first duty-ratio signals and a second solenoid valve whose opening is controlled in accordance with second duty-ratio signals, said first solenoid valve being disposed in said second hydraulic line means and said second solenoid valve being disposed in drain hydraulic line means for connecting said head-side chamber with a drain.

40. A control apparatus in a hydraulically operated continuously variable transmission with a hydraulic motor and a hydraulic pump interconnected by a closed hydraulic circuit, and clutch means for selectively short-circuiting said closed hydraulic circuit, comprising, a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, a rod integral with said piston on the side of the piston facing into the rod-side chamber, said rod extending out of said cylinder and being operatively connected to said clutch for operating said clutch according to the position of said piston in said cylinder, biasing means for biasing said piston toward said head-side chamber, first hydraulic line means for supplying a working fluid of a predetermined pressure to said rod-side chamber, second hydraulic line means for supplying a working fluid of a second pressure to said head-side chamber, valve means to regulate the second pressure, and shift means for disconnecting said second hydraulic line means from a pressure source and connecting said second hydraulic line means with a drain when a neutral range is selected, but allowing working fluid to flow from said pressure source through said second hydraulic line means when a running range is selected.

41. A control apparatus according to claim 40, wherein said neutral range is selected when said shift means is operated from a first state in which a forward range is selected to a second state in which a reverse range is selected.

42. A control apparatus according to claim 40, wherein working fluid is drained from said head-side chamber when said neutral range is selected.

43. A control apparatus according to claim 40, wherein said clutch is operated in a position to short-circuit said closed hydraulic circuit when said neutral range is selected.

44. A control apparatus according to claim 40, wherein said shift means may be operated between a forward state, said neutral range, and a reverse state, further comprising lockout means for preventing the completion of the operation of said shift means between one and the other of said forward state and said reverse state until said clutch is first placed in a condition to short-circuit said hydraulic circuit.

45. A control apparatus according to claim 40, wherein said shift means is operatively connected to gears for switching between a forward gear state and a reverse gear state.

46. A control apparatus according to claim 45, wherein said shift means first places said clutch in a condition to short-circuit said closed hydraulic circuit before switching between one of said forward and reverse gear states to the other of said forward and reverse gear states.

47. A control apparatus according to claim 40, wherein said first pressure is substantially constant.

48. A control apparatus according to claim 40, wherein when said second pressure is decreased, said rod is moved in a direction to open said clutch in a direction to short-circuit said closed hydraulic circuit.

49. A control apparatus according to claim 40, wherein said valve means comprises a first solenoid valve whose opening is controlled in accordance with first duty-ratio signals and a second solenoid valve whose opening is controlled in accordance with second duty-ratio signals, said first solenoid valve being disposed in said second hydraulic line means and said second solenoid valve being disposed in drain hydraulic line means for connecting said head-side chamber with a drain.

50. A control apparatus in a hydraulically operated continuously variable transmission with a hydraulic motor and a hydraulic pump interconnected by a closed hydraulic circuit, and a clutch in said transmission, comprising, a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, a rod integral with said piston on the side of the piston facing into the rod-side chamber, said rod extending out of said cylinder and being operatively connected to said clutch for operating said clutch according to the position of said piston in said cylinder, biasing means for biasing said piston toward said head-side chamber, first hydraulic line means for supplying a working fluid of a predetermined pressure to said rod-side chamber, second hydraulic line means for supplying a working fluid of a second pressure to said head-side chamber, and shift means for disconnecting said second hydraulic line means from a pressure source and connecting said second hydraulic line means with a drain when a neutral range is selected, but allowing working fluid to flow from said pressure source through said second hydraulic line means when a running range is selected, said shift means including a manual valve, and the disconnection of the second hydraulic line from the pressure source and the connection of the second hydraulic line with the drain being conducted by the manual valve when said neutral range is selected.

51. A control apparatus in a hydraulically operated continuously variable transmission with a hydraulic motor and a hydraulic pump interconnected by a closed hydraulic circuit, and clutch means for selectively short-circuiting said closed hydraulic circuit, comprising, a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, a rod integral with said piston on the side of the piston facing into the rod-side chamber, said rod extending out of said cylinder, said rod being operatively connected to said clutch for operating said clutch according to the position of said piston in said cylinder, biasing means for biasing said piston toward said head-side chamber, first hydraulic line means for supplying a working fluid of a predetermined pressure to said rod-side chamber, second hydraulic line means for supplying a working fluid of a second pressure to said head-side chamber, valve means disposed in said second hydraulic line means for regulating said second pressure, a hydraulic branch line one end of which is connected with a portion of said second hydraulic line means between a pressure source of said working fluid and said valve means, and the other end of which is connected with said head-side chamber, a check valve provided in said hydraulic branch line to allow a one-way flow of the working fluid from said head-side chamber through said hydraulic branch line but to block the flow of working fluid into said head-side chamber through said hydraulic branch line, and shift means for disconnecting said second hydraulic line means from said pressure source and connecting said second hydraulic line means with a drain when a neutral range is selected, but allowing working fluid to flow from said pressure source through said second hydraulic line means when a running range is selected.

52. A control apparatus according to claim 51, wherein said neutral range is selected when said shift means is operated from a first state in which a forward range is selected to a second state in which a reverse range is selected.

53. A control apparatus according to claim 51, wherein said working fluid is drained from said head-side chamber when said neutral range is selected.

54. A control apparatus according to claim 51, wherein said clutch is operated in a position to short-circuit said closed hydraulic circuit when said neutral range is selected.

55. A control apparatus according to claim 51, wherein said shift means is operatively connected to gears for switching between a forward gear state and a reverse gear state.

56. A control apparatus according to claim 55, wherein said shift means places said clutch in a condition to short-circuit said closed hydraulic circuit before switching between one of said forward and reverse gear states to the other of said forward and reverse gear states.

57. A control apparatus in a hydraulically operated continuously variable transmission with a hydraulic motor and a hydraulic pump interconnected by a closed hydraulic circuit, and clutch means for selectively short-circuiting said closed hydraulic circuit, comprising, a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, a rod integral with said piston on the side of the piston facing into the rod-side chamber, said rod extending out of said cylinder, said rod being operatively connected to said clutch for operating said clutch according to the position of said piston in said cylinder, biasing means for biasing said piston toward said head-side chamber, first hydraulic line means for supplying a working fluid of a predetermined pressure to said rod-side chamber, second hydraulic line means for supplying a working fluid of a second pressure to said head-side chamber, valve means disposed in said second hydraulic line means for regulating said second pressure, a hydraulic branch line one end of which is connected with a portion of said second hydraulic line means between a pressure source of said working fluid and said valve means, and the other end of which is connected with said head-side chamber, a check valve provided in said hydraulic branch line to allow a one-way flow of the working fluid from said head-side chamber through said hydraulic branch line but to block the flow of the working fluid into said head-side chamber through said branch line, and shift means for disconnecting said second hydraulic line means from said pressure source and connecting said second hydraulic line means with a drain in order to drain said head-side chamber and operate said clutch to short-circuit said closed hydraulic circuit when said shift valve is moved between a position corresponding to a forward range and a position corresponding to a reverse range.

58. A control apparatus in a hydraulically operated continuously variable transmission in a vehicle, said transmission having a hydraulic motor and a hydraulic pump interconnected by a closed hydraulic circuit, and clutch means for selectively short-circuiting said closed hydraulic circuit, comprising, a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, a rod integral with said piston on the side of the piston facing into the rod-side chamber, said rod extending out of said cylinder and being operatively connected to said clutch for operating said clutch according to the position of said piston in said cylinder, biasing means for biasing said piston toward said head-side chamber, first hydraulic line means for supplying a working fluid of a predetermined pressure to said rod-side chamber, second hydraulic line means for supplying a working fluid of a second pressure to said head-side chamber, gear shift means for changing between a forward state and a reverse state according to a driver's selection of one of said forward and reverse states, and interlock means for operating said clutch to short-circuit said closed hydraulic circuit before said gear shift means changes between one and the other of said forward and reverse states.

59. A control apparatus according to claim 58, wherein said interlock means operates said clutch to short-circuit said closed hydraulic circuit by connecting said head-side chamber with a drain.

60. A control apparatus in a hydraulically operated continuously variable transmission in a vehicle, said transmission having a hydraulic motor and a hydraulic pump interconnected by a closed hydraulic circuit, and clutch means for selectively short-circuiting said closed hydraulic circuit, comprising, a piston slidably fitted in a cylinder, said piston dividing said cylinder into a head-side chamber and a rod-side chamber, said piston having a first pressure-bearing surface facing into said head-side chamber and a second pressure-bearing surface facing into said rod-side chamber, said first pressure-bearing surface having an area that is greater than the area of said second pressure-bearing surface, a rod integral with said piston on the side of the piston facing into the rod-side chamber, said rod extending out of said cylinder and being operatively connected to said clutch for operating said clutch according to the position of said piston in said cylinder, biasing means for biasing said piston toward said head-side chamber, first hydraulic line means for supplying a working fluid of a predetermined pressure to said rod-side chamber, second hydraulic line means for supplying a working fluid of a second pressure to said head-side chamber, a directional change gear unit, directional change servo means for operating said directional change gear unit to selectively change between a forward gear state and a reverse gear state, and shift means for disconnecting said second hydraulic line means from a pressure source and connecting said second hydraulic line means with a drain when a neutral range is selected, but allowing working fluid to flow from said pressure source through said second hydraulic line means when one of said forward and reverse gear states is selected, wherein when one of said forward and reverse gear states is selected, said directional change servo means connects said head-side chamber to said drain through said shift means when beginning to operate said directional gear unit to change said gear state.

61. A control apparatus according to claim 60, wherein said directional change servo means ceases to connect said head-side chamber to said drain when said directional gear unit has been operated to change said gear state.

* * * * *